United States Patent
Baghdachi et al.

(10) Patent No.: US 7,863,375 B2
(45) Date of Patent: Jan. 4, 2011

(54) SELF-STRATIFYING AUTOMOTIVE TOPCOAT COMPOSITIONS AND PROCESSES

(75) Inventors: Jamil Baghdachi, Northville, MI (US); Heidi Rosalia Perez Hernandez, Neza Edo (MX); Cynthia Gazepis Templeman, Ypsilanti, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 175 days.

(21) Appl. No.: 12/247,226

(22) Filed: Oct. 8, 2008

(65) Prior Publication Data

US 2010/0087596 A1   Apr. 8, 2010

(51) Int. Cl.
 *C08K 5/16* (2006.01)
(52) U.S. Cl. .............. 524/714; 524/588; 524/589; 524/590; 524/728
(58) Field of Classification Search .............. 524/714, 524/588, 589, 590, 728
See application file for complete search history.

(56) References Cited

U.S. PATENT DOCUMENTS

| | | | |
|---|---|---|---|
| 6,683,151 B1 | 1/2004 | Loontjens et al. | |
| 7,186,772 B2 | 3/2007 | Berkau et al. | |
| 2003/0191207 A1 | 10/2003 | Dejima et al. | |
| 2004/0011657 A1 | 1/2004 | Muramoto et al. | |
| 2005/0123770 A1 | 6/2005 | Kawazu et al. | |
| 2006/0147639 A1 | 7/2006 | Tsujioka et al. | |

OTHER PUBLICATIONS

V. V. Verkholantsev, Self-stratifying coatings for industrial applications, Pigment and Resin Technology, 2003, pp. 300-306, vol. 32, No. 5, Emerald.
P. Vink and T. L. Bots, Formulation parameters influencing self-stratification of coatings, Progress in Organic Coatings, 1996, pp. 173-181, vol. 28, Elsevier.
A. Toussaint, Self-stratifying coatings for plastic substrates, Progress in Organic Coatings, 1996, pp. 183-195, vol. 28, Elsevier.

*Primary Examiner*—Edward J Cain
(74) *Attorney, Agent, or Firm*—Garrana Tran LLP

(57) ABSTRACT

A process for preparing a coating composition includes contacting a polyol, a silsesquioxane, a polyurethane dendrimer, and a crosslinker, wherein the polyol, the silsesquioxane, the polyurethane dendrimer, and the crosslinker are dispersed within a solvent and forming a self-stratifying coating. Further, a coating composition includes a polyol, a silsesquioxane, a polyurethane dendrimer and a crosslinker forming a mixture dispersed within a solvent.

17 Claims, 1 Drawing Sheet

SELF-STRATIFYING AUTOMOTIVE TOPCOAT COMPOSITIONS AND PROCESSES

TECHNICAL FIELD

Figure 1:
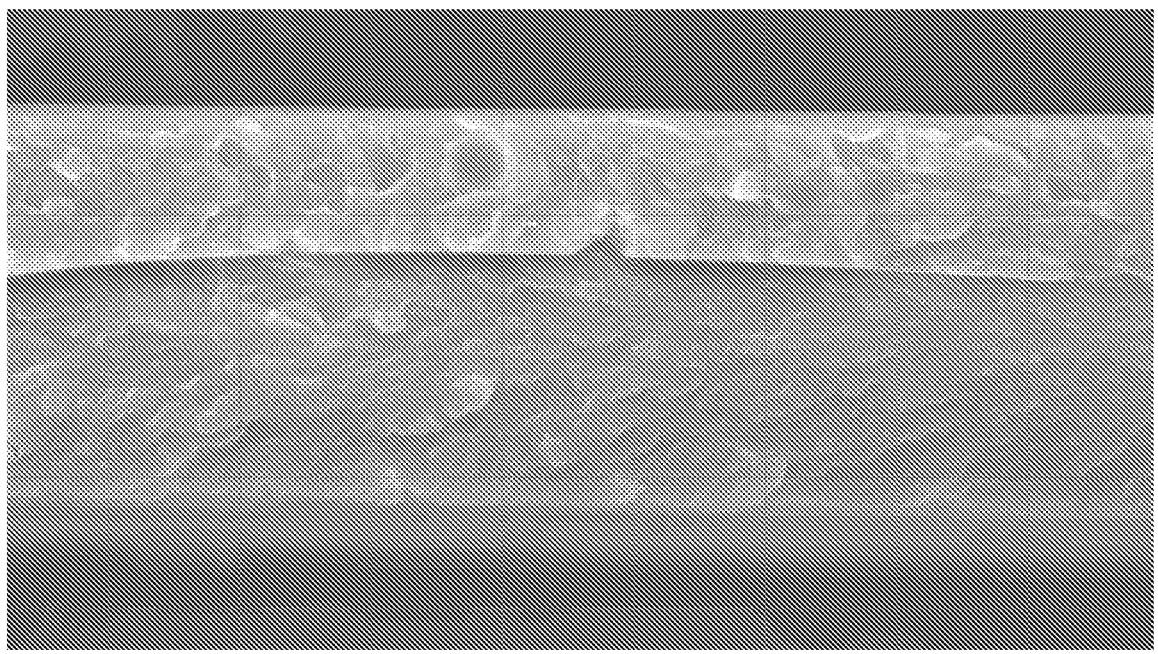

The present disclosure relates generally to coating compositions and, more specifically, to self-stratifying or self-layering coating compositions, their use in the automotive field and processes for preparing compositions thereof.

BACKGROUND

Coatings for transportation means, such as, for example, motor vehicles, airplanes and rail-mounted vehicles, may combine both functions of decoration and protection. In many circumstances, the coatings are developed to withstand extreme demands with respect to corrosion protection, scratch resistance, optics, coloring, chemical resistance, and resistance to other possible environmental effects.

Currently, coatings such as composite paints may comprise at least one multifunctional layer. For example, a composite paint such as an automotive topcoat may contain a basecoat (e.g., color coat) which is applied separately and before the application of a separate clearcoat. The functions of the top layer may include protecting coating pigments from the elements of weather, providing scratch and mar resistance, and providing gloss and the depth of field.

The application of multiple layers of coating may prove costly and present technical challenges such as prolonged application time and the like. Therefore, a need exists to develop a streamlined process of formulating and applying a coating reducing the number of layers or by combining at least one multifunctional layer, such as the basecoat and clearcoat, into one single layer. Further, the novel coating composition would preserve the current attributes and characteristics such as providing durability, ultraviolet (UV) light screening, higher gloss and an overall simplified application.

SUMMARY

The following presents a general summary of several aspects of the disclosure in order to provide a basic understanding of the disclosure. This summary is not an exhaustive overview nor is it intended to identify key or critical elements of the disclosure or to delineate the scope of the claims. The following summary merely presents some concepts of the disclosure in a general form as a prelude to the more detailed description that follows.

One aspect of the disclosure is a process for preparing a coating composition providing the steps of contacting a polyol, a silsesquioxane, a polyurethane dendrimer, and a crosslinker, wherein the polyol, the silsesquioxane, the polyurethane dendrimer, and the crosslinker are dispersed within a solvent and forming a self-stratifying coating.

Another aspect of the disclosure is a coating composition including a polyol, a silsesquioxane, a polyurethane dendrimer and a crosslinker forming a mixture dispersed within a solvent.

DETAILED DESCRIPTION

Before the present compositions and processes are described, it is understood that the present disclosure is not limited to the particular compositions or processes described, as such compositions and methods may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "an," and "the" may include plural referents unless the context clearly dictates otherwise. Thus, for example, reference to "a layer" refers to one or several layers, and reference to "a process for contacting" includes reference to equivalent steps and processes known to those skilled in the art, and so forth.

The present disclosure includes embodiments, implementations and/or aspects that relate to a coating composition, processes of use and preparing thereof. As one general example of a coating composition, the composition may comprise layers including a clearcoat, a basecoat primer surfacer, an electrocoat, zinc phosphate and a substrate. Further, a coating may comprise a clearcoat having a thickness of approximately 15-150 microns, a basecoat of approximately 10-50 microns, primer surfacer having a thickness of approximately 10-150 microns, an electrocoat having a thickness of approximately 25 microns, zinc phosphate having a thickness of approximately 1-4 microns and a substrate made from steel or the like.

The present disclosure describes compositions and processes that enable the selective phase separation of several mutually incompatible (practically partially compatible) single-phase resins, solvents and additive blends upon application and curing. The self-layering or self-stratifying concepts and processes herein are also applicable to solvent-based, waterborne and powder coatings which may require specific formulations and conditions of application and film formation.

Self-stratifying coating compositions described herein may allow the formulation of solvent-based composite systems based on blends of thermosetting polymers to produce micro-heterogeneous polymer/crosslinked polymer composites that separate into a predominately double-layer coating structure. A selective chemical reaction may occur between and among the components, examples of which include a polyol, a silsesquioxane, a polyurethane dendrimer, and a crosslinker, as a function of time and temperature. While in liquid form, the components may form a homogeneous solution and may not be crosslinked. Also, preferential migration of certain components may occur upon curing forming a stratified coating.

The manufacture of self-stratifying coating compositions may be the result of either mutual or partial incompatibility of the composite resins. The resins may separate into discrete phases or layers as a result of various properties such as differing surface tensions, when they are emulsified or dispersed in a particular solvent. Due to selectivity in using certain components with varied properties such as surface tensions, the system separates into at least two distinctive layers upon curing. The stratification of a homogeneous one-phase coating into two layers can result from removal, such as by evaporation, of the solvents which keeps the system of otherwise incompatible components in thermodynamic equilibrium. Furthermore, due to preferred and time/temperature selective crosslinking reactions among the polymer units which result in molecular growth, the equilibrium shifts the system phase separates into two distinct layers. It is understood that crosslinking reactions as discussed herein may follow conventional reactions between primary and secondary hydroxyl groups with isocyanate groups.

Aspects of automotive coatings may include crosslinking compositions which, upon curing, produce a stratified clear coating. Particular to the present disclosure is the formation of self-layering or self-stratifying coating compositions (e.g., films) from contacting components including, but not limited to, a polyol, a silsesquioxane, a polyurethane dendrimer, and a crosslinker emulsified or dispersed in a solvent. In certain aspects of the present disclosure, the polyol may be selected from a fluorinated polyol, such as a fluorinated polyether or a fluoroethylene-alkyl vinyl ether or the like. In addition, the silsesquioxane may contain an epoxy functional group and the polyurethane dendrimers may contain a hydroxyl functional group, as will be described herein. It is understood that contacting the aforementioned components may also refer to the combining, blending, mixing or reacting of the components to produce the resultant coating composition.

Any suitable solvent including a variety of solvents typically used in coatings may be utilized to dissolve the polyol, silsesquioxane, polyurethane dendrimers and crosslinkers. In certain aspects of the disclosure, tetrahydrofuran (THF) and/or dimethylacetamide (DMA) may be used as the solvent(s) in which the components are emulsified or dispersed.

In an example of a coating composition, the solvent-emulsified and/or dispersed components may be dried to afford a solid film by applying the mixture onto a substrate followed by the application of external heat. Any suitable external heat treatment may be applied to the wet film in the range of approximately 25-125° C. for 30 minutes followed by a further heat treatment at 125-160° C. for another 30 minutes to form a crosslinked film.

As used herein, the term "polyol" is also applicable to "diol". For example, a polyether polyol is a polyol possessing a polyoxyalkylene structure composed of a polyoxyalkylene group having 2 to 10 carbon atoms and an oxygen atom as a repetitive unit. The polyol compound of the present disclosure may include a polyhydric alcohol having 2 to 12 carbon atoms, specific examples thereof may include fluorinated polyether and the like. The polyol compounds may include both low and high molecular weight polyols having weight average molecular weight in the range of approximately 2000-10,000 Dalton. Commercially available polyols may include fluorinated polyether (as Polyfox 656, Polyfox 6520 from Omnova Solutions Inc.) and a hydroxyl functional fluoro ethylene alkyl vinyl ether (as Lumiflon 200 (LF 200) and Lumiflon 910 (LF 910) from Asahi Glass co., Japan and Asahi Glass America Inc., respectively). The polyol components of the present disclosure may be used individually or in combination of two or more thereof.

For the purpose of illustration only, a representative chemical structure of a polyol such as hydroxyl functional fluoroethylene-alkyl vinyl ether, for example, is illustrated by Structure A shown below. In the present structure, R may represent any alkyl or group including, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like.

Structure A

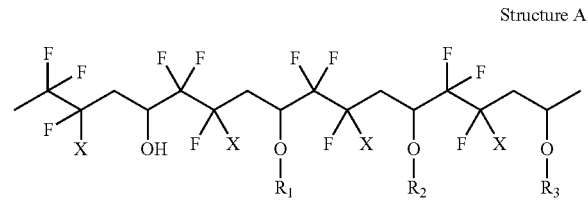

An exemplary epoxy functional silsesquioxane hybrid organic/inorganic oligomeric reactant may be prepared by contacting methyltrimethoxysilane with glycidoxypropyltrimethoxysilane in the presence of catalytic amounts of formic acid and water. Silsesquioxane may have the formula $(R)_6 (C_6H_{11}O_2)_2(SiO_{1.5})_8$ wherein R may represent any alkyl or aryl group including, but are not limited to, hydrogen, methyl, ethyl, propyl, butyl, pentyl, hexyl, cyclopentyl, cyclohexyl, benzyl or phenyl groups and the like, including all their isomers, for example, tertiary butyl, isopropyl, and the like. For the purpose of illustration only, a representative chemical structure of an epoxy functional silsesquioxane such as diepoxy silsesquioxane, for example, is illustrated by Structure B shown below.

Structure B

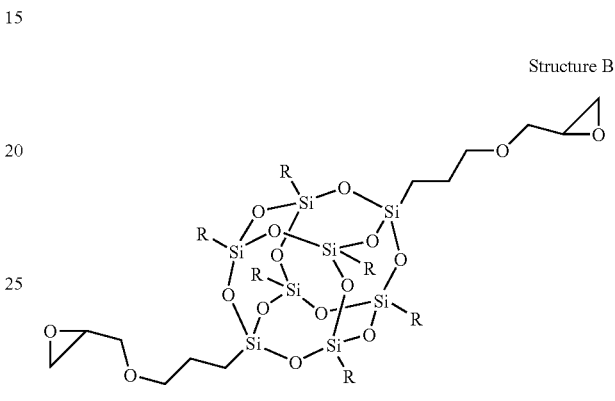

For the purpose of illustration only, a representative chemical structure of an exemplary hydroxyl-functional polyurethane dendrimer, such as an isophorone diisocyanate-based dendrimer is illustrated by Structure C shown below.

Structure C

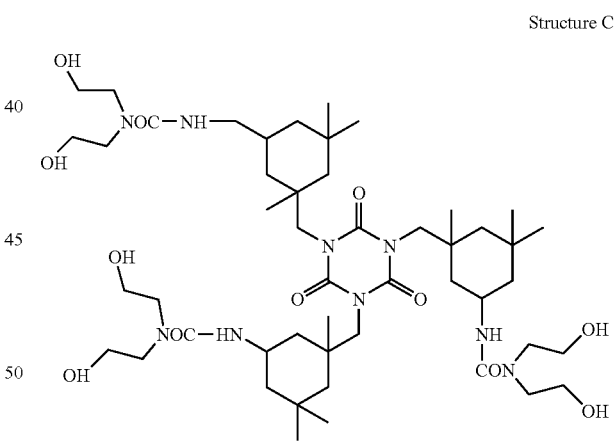

The polyurethane dendrimers of the present disclosure may be produced by following any conventional reaction procedure of producing polyurethane compounds. An example of such polyurethane dendrimer used in this disclosure can be prepared by reacting appropriate amounts of diethanolamine with a commercially available isophorone triisocyanurate (IPTI) resin at temperatures ranging from 0-20° C.

Another component is a crosslinker, which can react with both the aforementioned polyol and the hydroxyl-functional polyurethane dendrimer. A representative general chemical structure of a crosslinker, such as a hexamethylene diisocyanate (HDI) crosslinker, is shown below as Structure D. Possible crosslinkers may include, but are not limited to HDI, hexamethylene triisocyanate (HTI), methylene bis-(4-cyclohexyl isocyanate) (HMDI) and a combination thereof.

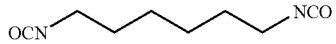

Structure D

The reaction of hydroxyl compounds with isocyanate compounds is generally known. The current disclosure employs hydroxyl compounds that have different reactivity towards crosslinkers such as di- and triisocyanates. Examples of the before-mentioned isocyanate compounds may include polyfunctional isocyanate compounds such as diisocyanate and triisocyanates, for example, isophorone diisocyanate (IPDI), isophorone triisocyanate (IPTI), hexane diisocyanate and the like. In general, catalysts used in such reactions may include metal-organic compounds such as tin and titanium reaction products and certain tertiary amine compounds. Examples of catalysts may include 1,4-diazabicyclo[2.2.2]octane (DABCO), triethylamine and the like. The amount of catalysts utilized varies based on the reactants, formulation variables, types of both crosslinker and polyols as well as desired cure speed. The preferred amounts range from 0.01-5% by weight based on the total resin solids of the formulated product.

The coating composition may be applied immediately on a substrate after it is produced by contacting a fluorinated polyol, an functionalized silsesquioxane, polyurethane dendrimer, a solvent and any catalyst or additives, if necessary. The self-stratifying coating can be applied by a wide variety of techniques including brushing, roll coatings, spray, drawdown methods and the like. In general, the stratification may not be affected by the application method. While any film thickness in the range of approximately 0.1-10 mils or 2.5-250 microns may result in a stratified coating, in one embodiment, the film thickness may be in the range of 25-75 microns.

The coating composition of the present disclosure may be used for a variety of substrates, for example, plastics, metals (e.g., aluminum), glass and their molded products. More particularly, it may be used for automotive exterior and interior parts such as the body and doors, interior panels and consoles and the like.

The following examples are set forth for the purpose of explanation, and not limitation, to provide a thorough understanding of the present disclosure, including representative advantages thereof.

Example 1

Formulation and application. 0.75 g of epoxy silsesquioxane dissolved in 67% tetrahydrofuran (THF) and isophorone diisocyanate (IPDI) trimer based dendrimer solution (34% in dimethylacetamide (DMA)) were weighed in a vial and stirred to produce a clear solution. 0.65 g hexane diisocyanate (HDI) (75% Desmodur N75), 1.5 g Lumiflon 200 and 0.25 g N,N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a liquid thickness of 8 mL.

Flash off and curing conditions. The mixture was flashed off at room temperature for 30 minutes. Some coating processes and applications require a flash off stage in which the coating is allowed to stand either at room temperature or at slightly elevated temperatures for a short period of time before baking at elevated temperatures. The flash-off times may vary depending on formulation and may be based on variables such as film thickness, ambient or oven temperatures, air current velocity, and diluents or solvents used in the coating. In general a flash-off time in the range of approximately 2-15 minutes at ambient temperature may be applied to prepare coatings for further heat application. The film was then cured at 100° C. for 30 minutes. Subsequently, the film was cured at 120° C. for 30 minutes. In a typical application of an automotive coating, a basecoat is applied and allowed to flash off for approximately 5-10 minutes before the application of a clearcoat. The composite coating is then flashed off for another 5-10 minutes before entering into a bake oven.

Test sample preparation. Samples were prepared for analysis by Scanning Electron Microscopy (SEM) and Energy Dispersive X-Ray (EDX). A steel panel was cut to obtain a slide approximately 2 cm in width. A homogeneous coating mixture was processed to afford stratified coatings on standard steel panels measuring 3 inches by 6 inches. To prepare panels for SEM and EDX analysis the panels were cut into about 2 cm by 1 centimeter portions to produced slides. The coating slides were maintained at liquid nitrogen temperature measuring in the range of approximately −199 to −150° C. The slide was then inserted into liquid nitrogen and removed. The previous steps were repeated approximately 20 times until the slide reached a very cold temperature such as approximately −175° C. The slide was bent to break the film into multiple pieces to result in cross-sectional surfaces. The samples or pieces of film were then transferred to a SEM stage stub with the cross-sectional surfaces facing upward. The stage stub with samples of film were placed in a chamber of sputter device the Denton Vacuum DeskIV in the present procedure, and the samples were sputtered with gold particles to produce conductive samples.

SEM and EDX Analysis. Scanning Electron Microscopy (SEM) instrumentation, the Hitachi SEM model S3400N with EDX spectrometer in the present procedure, was utilized to verify the stratified layers of the samples of film as shown in FIG. 1. Through such analysis a cross-section containing two layers was viewed. EDX analysis was then conducted to insure the elemental composites such as fluorine (F), silicon (Si) and oxygen (O) of each layer.

Methods and processes discussed herein may provide a streamlined process of manufacturing a coating composition in which the number of layers are reduced, such as by combining at least one multifunctional layer (e.g., basecoat, clearcoat) into one single layer. Further, the coating composition provided herein may preserve the attributes and characteristics found in typical coatings such as providing durability ultraviolet (UV) light screening, high gloss and an overall simplified application.

Various methods and processes are contemplated including all or less than all of the steps described herein and/or mentioned above, any number of repeats or any of the steps shown and/or mentioned above, and performance of the steps in any order.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A process for preparing a coating composition, the process comprising:
   contacting a polyol, a silsesquioxane, a polyurethane dendrimer, and a crosslinker, wherein the polyol, the silsesquioxane, the polyurethane dendrimer, and the crosslinker are dispersed within a solvent; and
   forming a self-stratifying coating.

2. The process of claim 1, wherein the polyol is selected from the group consisting of a fluorinated polyether polyol, a hydroxyl functional fluoroethylene-alkyl vinyl ether and a combination thereof.

3. The process of claim 1, wherein the silsesquioxane is an epoxy functional silsesquioxane having a formula $(R)_6(C_6H_{11}O_2)_2(SiO_{1.5})_8$, wherein R is selected from the group consisting of hydrogen, methyl, ethyl, propyl, butyl, pentyl, hexyl, cyclopentyl, cyclohexyl, benzyl, and phenyl.

4. The process of claim 3, wherein the epoxy functional silsesquioxane is a diepoxy silsesquioxane.

5. The process of claim 1, wherein the polyurethane dendrimer is derived from the group consisting of isophorone diisocyanate (IPDI), isophorone triisocyanate (IPTI), and a combination thereof.

6. The process of claim 1, wherein the crosslinker is an isocyanate-functional compound selected from the group consisting of hexamethylene diisocyanate (HDI), hexamethylene triisocyanate (HTI), methylene bis-(4-cyclohexyl isocyanate) (HMDI) and a combination thereof.

7. The process of claim 1 further comprising removing the solvent.

8. The process of claim 7, wherein the solvent is selected from the group consisting of tetrahydrofuran (THF), dimethylacetamide (DMA) and a combination thereof.

9. The process of claim 7, wherein removing the solvent comprises evaporating the solvent.

10. A coating composition comprising:
    a polyol, a silsesquioxane, a polyurethane dendrimer and a crosslinker forming a mixture dispersed within a solvent.

11. The composition of claim 10, wherein the polyol is selected from the group consisting of a fluorinated polyether polyol, a hydroxyl functional fluoroethylene-alkyl vinyl ether and a combination thereof.

12. The composition of claim 10, wherein the silsesquioxane is an epoxy functional silsesquioxane having a formula $(R)_6(C_6H_{11}O_2)_2(SiO_{1.5})_8$, wherein R is selected from the group consisting of hydrogen, methyl, ethyl, propyl, butyl, pentyl, hexyl, cyclopentyl, cyclohexyl, benzyl, and phenyl.

13. The composition of claim 12, wherein the epoxy functional silsesquioxane is a diepoxy silsesquioxane.

14. The composition of claim 10, wherein the polyurethane dendrimer is derived from the group consisting of isophorone diisocyanate (IPDI), isophorone triisocyanate (IPTI) and a combination thereof.

15. The composition of claim 10, wherein the crosslinker is an isocyanate-functional compound selected from the group consisting of hexamethylene diisocyanate (HDI), hexamethylene triisocyanate (HTI), methylene bis-(4-cyclohexyl isocyanate) (HMDI) and a combination thereof.

16. The composition of claim 10, wherein the solvent is selected from the group consisting of tetrahydrofuran (THF), dimethylacetamide (DMA) and a combination thereof.

17. The composition of claim 10, wherein the solvent is removed to form a self-stratifying coating composition.

* * * * *